United States Patent [19]

Holmes et al.

[11] Patent Number: 4,514,850
[45] Date of Patent: Apr. 30, 1985

[54] COMMON-PASS DECENTERED ANNULAR RING RESONATOR

[75] Inventors: Dale A. Holmes, Simi Valley; Thomas R. Waite, Canoga Park, both of Calif.

[73] Assignee: Rockwell International Corporation, El Segundo, Calif.

[21] Appl. No.: 494,848

[22] Filed: May 16, 1983

[51] Int. Cl.³ ............................................. H01S 3/08
[52] U.S. Cl. ...................................... 372/95; 372/93; 372/108; 372/103
[58] Field of Search .................... 372/95, 93, 103, 108

[56] References Cited

U.S. PATENT DOCUMENTS

| | | | |
|---|---|---|---|
| 3,909,744 | 9/1975 | Wisner et al. | 372/95 |
| 4,050,036 | 9/1977 | Chambers et al. | 372/95 |
| 4,190,814 | 2/1980 | Van Workum | 372/93 |

OTHER PUBLICATIONS

Freiberg et al; "Split-Mode Unstable Resonator"; Appl. Opt; vol. 16, No. 5, May, 1977, p. 1192.
Chodzko et al; "Annular (HSURIA) Resonators: some Experimental Studies Including Polarization Effects"; Appl. Opt., vol. 19, No. 5, Mar. 1, 1980, p. 778.
Guha et al; "Performance of an Annular Resonator with a Polarizer in the Annular Leg"; Appl. Optics, vol. 20, No. 23, Dec. 1, 1981, p. 4135.

Primary Examiner—William L. Sikes
Assistant Examiner—Léon Scott, Jr.
Attorney, Agent, or Firm—H. Fredrick Hamann; Harry B. Field

[57] ABSTRACT

An optical resonator having an annular cylindrical gain region for use in a chemical laser or the like in which two ring-shaped mirrors having substantially conical reflecting surfaces are spaced apart along a common axis of revolution of the respective conical surfaces. A central conical mirror reflects incident light directed along said axis radially outwardly to the reflecting surface of a first one of the ring-shaped mirrors. The radial light rays are reflected by the first ring mirror to the second ring mirror within an annular cylindrical volume concentric with said common axis and forming a gain region. Light rays impinging on the second ring mirror are reflected to diametrically opposite points on the same conical mirror surfaces and back to the first ring mirror through the same annular cylindrical volume. The return rays are then reflected by the conical mirror surface of the first ring mirror back to the central conical mirror. The mirror surfaces are angled such that the return rays are reflected back along the common axis by the central mirror in a concentric annular cylindrical volume. A scraper mirror having a central opening centered on said axis and an offset opening reflects all but the rays passing through the two openings in an output beam. The rays passing through the second opening are reflected back through the first opening to provide feedback.

15 Claims, 7 Drawing Figures

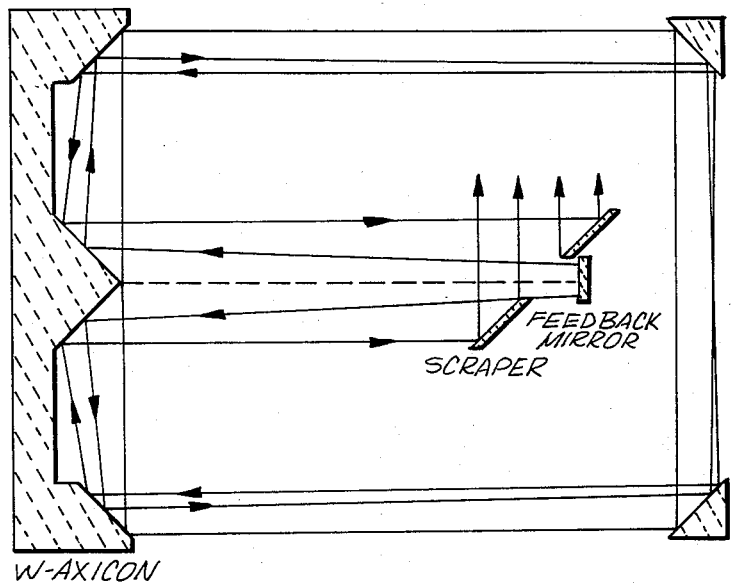
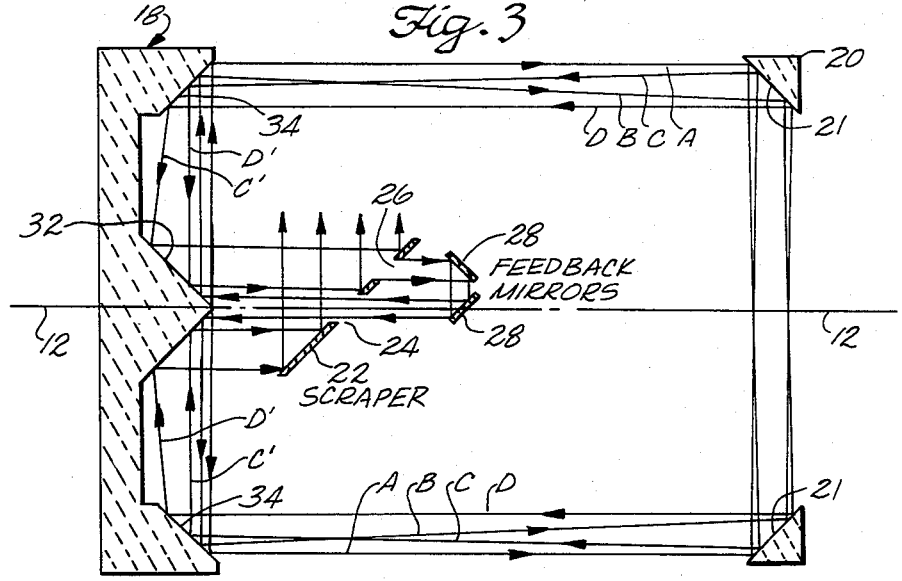

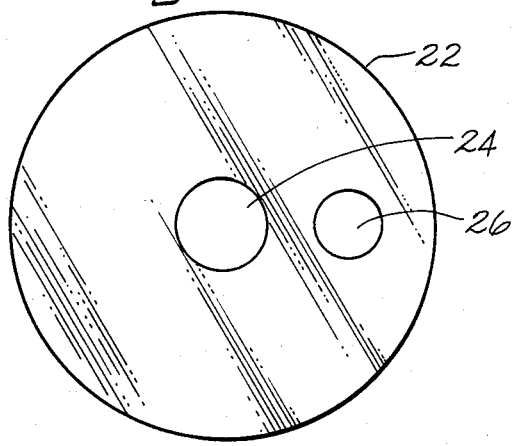
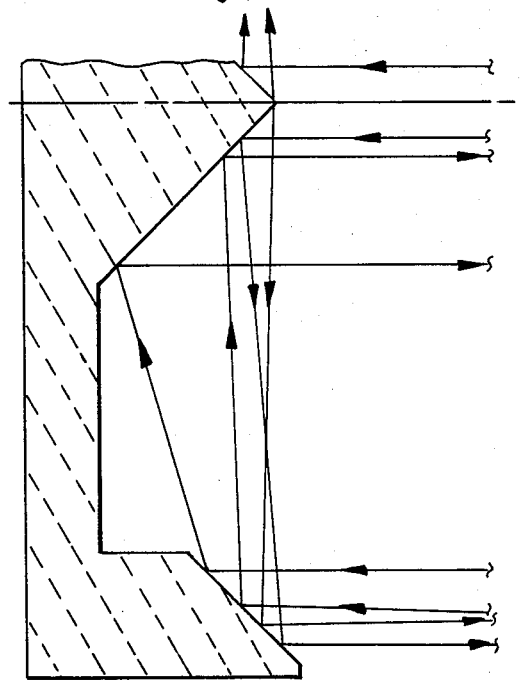 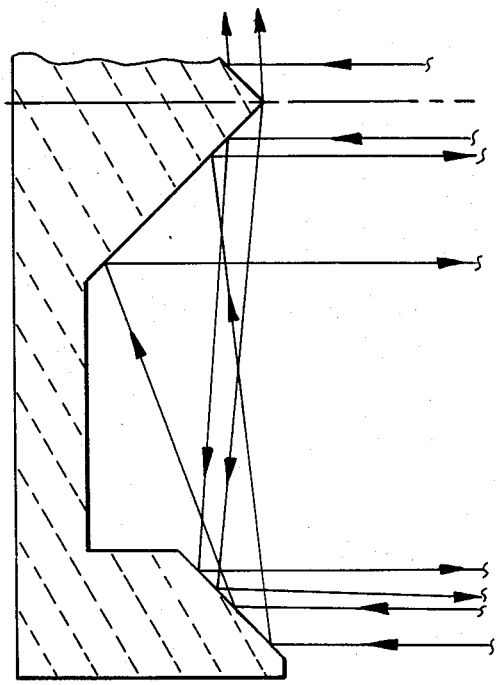

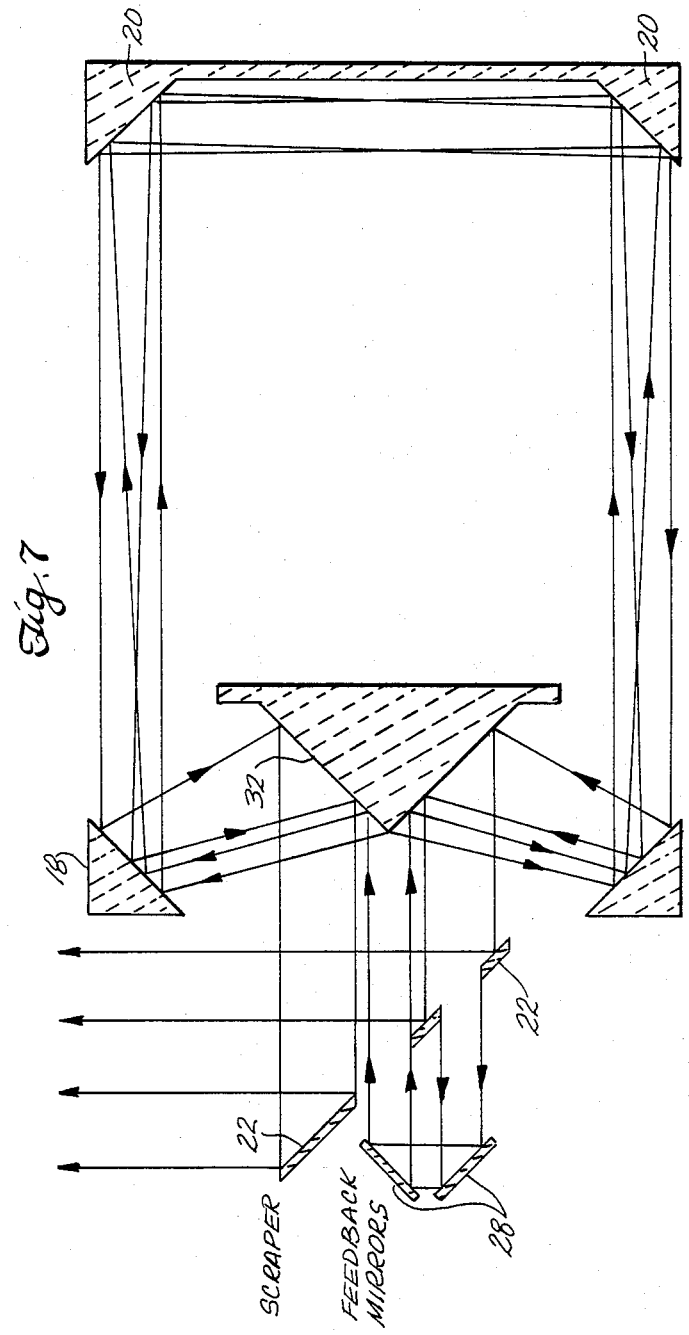

COMMON-PASS DECENTERED ANNULAR RING RESONATOR

STATEMENT OF GOVERNMENT INTEREST

The Government has rights in this invention pursuant to Contract No. F29601-80-C-0041 awarded by the U.S. Department of the Air Force.

FIELD OF THE INVENTION

This invention relates to optical resonators for laser and the like and, more particularly, to a resonator having an annular cylindrical gain region.

BACKGROUND OF THE INVENTION

Optical resonators for lasers have typically used optical resonators consisting of a pair of spaced reflecting surfaces which reflect light rays back and forth through a gain region where laser pumping takes place. Energy is extracted from the resonator around the outside edge of one of the mirrors or by providing an opening in one of the mirrors or by half silvering one of the mirror surfaces so that a portion of the light rays are transmitted through or around the mirror while the remaining portion is reflected back through the gain region. In some types of chemical lasers it is desirable to provide a resonator in which the light rays pass through an annular cylindrical shaped gain region. This has been accomplished in the past by means of a conical mirror unit positioned between the two reflecting surfaces of the resonator. The conical mirror unit, sometimes referred to as a W-axicon, consists of a central 90° conical mirror surrounded by a ring mirror having a 90° conical surface. Light directed in a compact beam along the axis of the central conical mirror is reflected radially outwardly at 90° to the axis of the cone where it impinges on the conical reflecting surface of the surrounding ring mirror. The conical surface of the ring mirror in turn directs the light rays in a direction parallel to the axis of the cone within an annular cylindrical volume concentric with the axis of the cones. A flat mirror may be used to reflect the light in the cylindrical volume back to W-axicon for concentrating it again into a compact beam.

Such a mirror arrangement provides the desired annular shaped gain region but presents formidable alignment problems of the reflecting surfaces and also presents problems in extracting high levels of optical energy from the resonator.

An improved annular resonator used to extract optical power from the annular gain region was developed utilizing four mirror assemblies. This resonator, shown in FIG. 1, consists of a feedback mirror having a substantially spherical surface contour, a W-axicon consisting of a central conical mirror surface and a surrounding ring having a conical mirror surface, a second or rear annular ring having a conical reflector surface, and a scraper mirror having a flat surface with a central hole positioned between the feedback mirror and the central conical mirror. The gain region from which optical power is extracted is contained within an annular volume extending between the two ring mirrors or axicons. The second ring mirror acts as a retroreflector that causes each ray to return on the opposite side of the annular region, allowing for compensation of slight misalignments. In operation, a spherical wave beginning at the feedback mirror, passes through the opening in the scraper mirror and impinges on the central conical mirror of the W-axicon assembly. This incident compact spherical beam is reflected by the central conical mirror radially outwardly to the first ring mirror from which it is reflected toward the rear ring mirror as an annular shaped beam. This annular beam extending between the two ring mirrors fills the annular gain region where power is extracted by well-known lasing action. The rear ring mirror rotates the beam through 180° in two reflecting stages and directs a nominally collimated annular beam back to the first ring. The central conical mirror then directs the light rays in a nominally collimated beam back to the scraper mirror. The portion of the collimated beam that passes through the hole in the scraper is again reflected by the back mirror and provides feedback for another pass around the closed path of the resonator.

While the resonator configuration of FIG. 1 has the advantage that only two conical mirror assemblies are required which can be diamond turned after assembly to provide permanent and accurate alignment, this resonator design has several problems when used for practical applications. To insure that the resonator operates in a single tranverse uniphase mode, the central conical mirror must be accurately finished right out to the very tip of the central cone. Also the azimuthal figure error permitted on the conical mirrors is extremely small, being a small fraction of the laser wavelength. Also in transforming the collimated annular beam into the collimated compact beam directed at the scraper mirror, very high energy levels near the tip of the cone can occur which can damage the tip region of the central conical mirror.

SUMMARY OF THE INVENTION

The present invention is directed to an improved annular resonator for extracting optical power from the annular gain region. While retaining the advantages of the prior art resonator described above, the resonator of the present invention overcomes the problem areas associated with the earlier design. Specifically, the line optical axis can be adjusted so that it avoids the region near the conical tip of the central mirror. Stable single transverse mode operation is maintained even though the azimuthal figure error on the conical mirrors is relatively large. Also, no annular beam is compacted to the very tip of the central conical mirror. The effect is to reduce the energy or intensity level at the tip of the conical mirror by a factor of 50 to 10, thus allowing the resonator to operate at higher power levels than has heretofore been practical.

These and other advantages of the present invention are achieved by providing an annular resonator in which a compound W-axicon mirror is provided in combination with a ring mirror. Incident feedback rays directed close to and along the axis of revolution of the conical mirror surfaces in a compact beam are directed by the compound W-axicon through an annular region in a generally diverging pattern. These diverging rays are redirected back through the outer annular region by the ring mirror in a generally converging pattern to the compound W-axison, which redirects the return rays in an inner annular beam coaxial with the incident feedback rays. A small portion of the inner annular beam is reflected by feedback mirrors back along the axis to provide the incident rays, thus forming a closed loop path around the resonator. The balance of the annular inner beam is directed out of the resonator.

DESCRIPTION OF THE DRAWINGS

For a better understanding of the invention, reference should be made to the accompanying drawings, wherein:

FIG. 1 is a schematic cross-sectional view of a prior art annular resonator;

FIG. 3 is a sectional view of a typical embodiment of the invention;

FIG. 4 shows the scraper mirror as viewed along the axis of the output beam;

FIG. 5 is a partial sectional view of an alternative W-axicon embodiment of the present invention;

FIG. 6 is a partial sectional view of an alternative W-axicon embodiment of the present invention; and FIG. 7 is a schematic sectional view of yet another embodiment of the present invention, employing a Reflaxicon.

DETAILED DESCRIPTION

Figure 2:
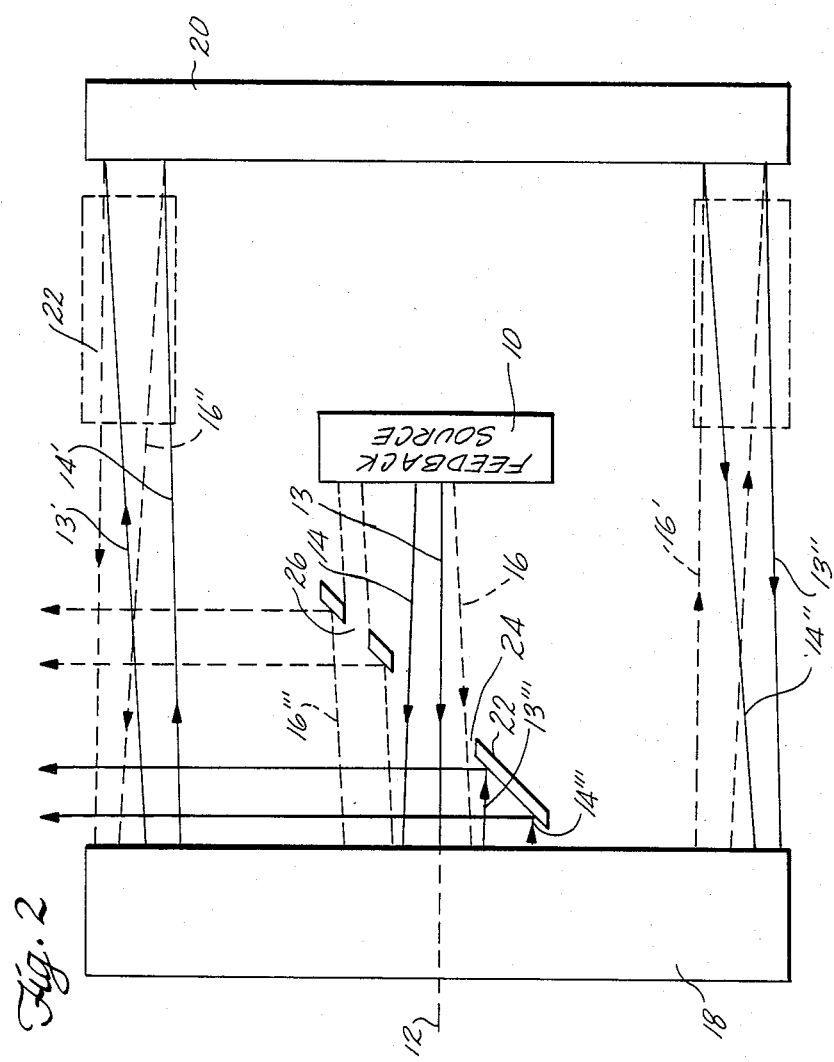
FIG. 2 is a schematic view of a generalized embodiment of an annular resonator of the present invention.

Referring to FIG. 2, there is shown a generalized or schematic representation of the optical system of the present invention. Consider the numeral 10 in FIG. 2 as representing the source of a compact light beam having an apparent point source lying along the central symmetry axis 12 of the resonator. The compact beam, in the two-dimensional illustration of FIG. 2, includes a central ray 13 aligned along the symmetry axis and an outer ray 14 on the edge of the compact beam. Similarly, a ray 16, shown as a dotted line, represents a ray at the lower margin of the compact beam. While shown in only two dimensions in FIG. 2, it will be understood that the compact beam is a three-dimensional bundle of rays directed along the central axis of the system. This bundle of rays, although illustrated as a diverging beam, may be a collimated beam having an apparent point source at infinity along the central axis.

The compact beam from the feedback source 10 is incident on a mirror system 18 which may take a variety of forms, such as described in detail hereinafter. The mirror system 18 directs the rays of the compact beam radially outwardly from the symmetry axis 12 and then back out in an axial direction toward a second mirror system 20. Thus the incident rays 13 and 14 emerge as rays 13' and 14'. Similarly, the lower ray emerges as ray 16'. Thus as a three-dimensional system, the compact beam emerges as an outer annular beam. This outer annular beam is concentric with the compact beam along the central axis. After passing through an annular gain volume, indicated at 22, of a chemical laser, for example, the rays 13' and 14' in the annular beam are directed radially by the mirror system 20 and emerge at the diametrically opposite position, as indicated at 13" and 14". Thus each ray, in passing between the mirror systems 18 and 20, passes through the annular gain region 22 twice.

On re-entering the mirror system 18, the rays are directed radially inwardly and then emerge off the central axis 12. In the three-dimensional system, these emerging rays are located in an intermediate annular region which surrounds the compact beam, as indicated by the emerging rays 13''', 14''', and 16'''. This emerging annular beam is preferably intercepted by a scraper mirror 22 which may be a flat mirror extending at a nominal angle of 45° to the central axis so as to reflect the rays of the intermediate annular beam out of the resonator in a direction nominally perpendicular to the central axis. The scraper mirror 22 has a central opening 24 through which the compact beam passes in going from the source 10 to the mirror system 18. In addition, the scraper mirror is provided with a small opening 26 which allows some of the rays in the intermediate annular beam to pass through the scraper mirror 22 and impinge on the source 10. The source 10 is a mirror system which acts as a feedback system for redirecting these incident rays back out from the source as the compact beam. The feedback mirror system 10 may consist of any number of flat or curved surface mirrors that may be appropriate for a desired embodiment of this invention.

The mirror systems 18 and 20 are designed to direct the compact beam with its apparent point source located along the central axis 12 into an outer annular beam having rays which pass in both directions through the annular gain region, and are then emitted as an inner annular beam which surrounds the compact beam and in which the apparent point source of the rays is also centered on the optical axle 12. By having the high energy return rays located off the central axis, the problems associated with the prior art system of FIG. 1 are avoided.

Referring to FIG. 3 in detail, the mirror system 18 is shown as a compound mirror assembly including an inner or central conical mirror 32 and an outer conical mirror 34. Such double conical mirror assembly is sometimes referred to as a W-axicon because the coaxial conical mirrors form a W-shape in cross section. Both conical mirrors 32 and 34 are concentric, sharing a common axis of revolution 12.

The second mirror system 20 is in the form of a ring having an interior conical mirror 21 concentric with the same common axis 12.

The central conical mirror 32 is formed as two slightly curved conical surfaces with the curve of the outer (larger diameter) surface being slightly different from the conical inner curved (smaller diameter) surface of the central cone.

The two surfaces form a compound or biaxicon mirror. The transition between the two distinct slightly curved surfaces of the integrated central axicon mirror can be facilitated by a continuous mechanical structure as indicated by FIG. 3. The two distinct curves of the central axicon surfaces are slight and in most cases hardly discernable from each other or from a single straight line cone in the scale of FIG. 3. In actual practice, it may be possible and/or desirable that one or both of the curved sections actually be a straight line instead of a curve. The curves may be slightly convex or concave, as required, for reflecting the rays of the central compact beam and the surrounding inner annular group of return rays.

Similarly, the mirror 34 is a biconic reflector. The surface of the interior mirror 34 is formed as two adjacent continuous conical surfaces with slightly different curvature.

The mirror surface 21 of the second ring mirror is formed of a single curved conical surface such that rays parallel to the axis 12 striking respectively the outer margin and the inner margin of the surface 21 are reflected at slightly different angles so as to converge slightly toward the diametrically opposite position on the conical surface 21 of the ring mirror 20. The important function of the conical curved surface 21 is to convert the diverging annular ray bundle bounded by rays A and B into a counter propagating converging annular ray bundles bounded by rays C and D.

The resonator further includes a flat scraper mirror 22 which typically extends at an angle of 45° to the central axis 12. The scraper mirror has two openings, a central opening 24 which is centered on the axis 12 and an off-center opening 26 which is positioned between the central opening 24 and the outer margin of the scraper mirror, as best shown in FIG. 4. Positioned behind the scraper mirror is a sequence of feedback mirrors 28 which transform the rays passing through the off-center hole 26 so that they enter the central hole 24 in the scraper mirror. The feedback mirror system 28 is one means of implementing the source mirror system 10 of FIG. 2. The W-axicon mirror assembly 18, the ring mirror 20, scraper mirror 22 and feedback mirrors 28 are supported in a suitable rigid mounting framework (not shown). The mirror assembly 18 is preferably mounted in rigid framework before the mirror surfaces 32 and 34 are machined so that accurate alignment can be maintained between the various W-axicon mirror surfaces.

The resonator of FIG. 3 thus operates to meet the optical requirements of directing a compact beam on the central axis through an annular gain region and then returning the rays in an annular region surrounding the compact beam and centered on the same central axis.

The compact beam rays reflected from the mirror 34 through the gain region are reflected by the mirror surface 21 to diametrically opposite positions on the conical mirror 20. Because of the slight curvature of the conical surface 21, the slightly diverging incident rays are reflected along less divergent or slightly convergent paths in passing from the diametrically opposite positions on the mirror surface 21. The slightly converging rays C and D, when reflected off the surface of the conical mirror 34, become diverging rays C' and D' which are then reflected off the inner mirror 32 and directed at the scraper mirror 22. Except for the return rays which pass through the off-center opening 26 to the feedback mirrors 28, the light from the scraper mirror 22 is directed at 90° in a lateral beam out of the resonator. The bundle of light rays passing through the opening 26 are fed back by the feedback mirrors 28 through the central opening 24 to make another pass around the resonator and through the annular gain region between the front mirror assembly 18 and the rear mirror ring 20. It will be noted that none of the return rays reflected off the central conical mirror 32 pass through the central opening 24 to the feedback mirrors. All of the return rays originating from the incident rays passing through the opening 24 to the conical surface 32, end up within an annular region surrounding the bundle of incident rays passing through the opening 24. If the optical axis of the resonator (as distinguished from the central axis of the conical optical elements) is defined as the optical ray that self-replicates after one round trip through the resonator optical system, it will be seen that this resonator optical axis is a single unique line everywhere in the resonator. This resonator optical axis never becomes a surface as it does in the prior art resonator.

The improved resonator of FIG. 3 retains the advantages of the prior art resonator in that only two conical mirror assemblies are required to introduce and extract the annular beams that pass through the gain region. The compound W-axicon assembly 18, even though the two conical mirror surfaces are each divided into distinct reflecting surfaces at slightly different conical angles, can be formed by diamond turning techniques after the W-axicon is assembled, thus assuring permanent and accurate alignment of the individual reflecting surfaces. The double pass propagation through the gain region during each round trip of the resonator yields efficient power extraction.

While retaining the advantages of the prior art resonator, the improved resonator of FIG. 3 has the further advantage that the line optical axis of the improved resonator can be adjusted so that it avoids the region near the tip of the central conical mirror. This avoids the necessity of maintaining a high accuracy in the finishing of the conical tip in the immediate region of the tip or point, which is difficult to do. Stable single mode operation is maintained even in the presence of a relatively large azimuthal figure error on the conical mirrors. Also no annular beam is compacted to the tip of the central conical mirror, thus greatly reducing the intensity loading at the tip.

FIGS. 5 and 6 are directed to modifications of the W-axicon of FIG. 3. FIG. 5 shows the conical mirrors as compound mirrors divided into two sections, one pair of sections forming a negative branch of the W-axicon and the other sections forming a positive branch. FIG. 6 shows a compound W-axicon in which the two branches produce a criss-cross focal arrangement.

FIG. 7 shows a further arrangement in which the conical surface of the central mirror is reversed so that the scraper mirror 22 and feedback mirrors 28 are positioned outside the annular gain region. Otherwise, the resonator operates in the same manner as the embodiment of FIG. 3. The arrangement of FIG. 7, while having the advantage of bringing the scraper mirror and hence the output beam outside of the annular region, is more difficult to fabricate, assemble and align.

It is to be understood that what has been described is merely illustrative of the principles of the invention and that numerous arrangements in accordance with this invention may be devised by one skilled in the art without departing from the spirit and scope thereof.

What is claimed is:

1. An optical resonator, for use in a laser having an annular gain region comprising:
   a first ring mirror having an annular interior conical reflecting surface, a second ring mirror having an annular interior substantially conical reflecting surface spaced from and facing the reflecting surface of said first ring mirror, the cones which would be formed by extension of the conical surfaces of each ring mirror to an apex being coaxial, a central mirror having an exterior substantially conical reflecting surface coaxial with the conical surfaces of the first and second mirrors, said central mirror located radially inward and on the axis of said first ring mirror, a scraper mirror having a reflecting surface positioned along the axis of the central mirror at an angle to and opposite the central mirror, the scraper mirror having a first opening aligned with said axis and a second opening positioned to one side of the first opening such that light rays passing through the second opening intercept the conical surface of the central mirror, and feedback mirror means for reflecting light rays passing from the central mirror through the second opening in the scraper back through the first opening to the central mirror, the rays passing through the first opening of said scraper mirror impinging on the central mirror in the regin of the apex of the conical reflecting surface, said rays being reflected substantially radially outwardly to the reflecting surface of the first ring mirror and from the reflecting surface of the first mirror in an annular cylinder to the reflecting surface of the second ring mirror, radially across the second ring mirror to the diametrically opposite side of the second ring mirror reflecting surface, back to the first ring mirror surface, radially inwardly to the central mirror, and in an annular space surrounding the rays passing through said first opening to the scraper mirror, a portion of the rays passing through the second opening being reflected by the feedback mirror means through the first opening to form a closed path for some of the light energy.

2. Apparatus of claim 1 wherein the reflecting surfaces of the central mirror and the first ring mirror are each divided into at least two annular reflecting regions, the two regions of the central mirror reflecting surface forming a slightly concave reflecting surface and the two regions of the first ring mirror forming a slightly convex reflecting surface.

3. Apparatus of claim 2 wherein incident rays directed at the central mirror through the first opening impinge on one of said concentric conical regions at the tip region of the central mirror and are reflected in a closed path from the central conical mirror to said first and second ring mirrors and back to the central mirror, the return rays being reflected by the other of said two annular reflecting regions of the central mirror.

4. Apparatus of claim 3 wherein the rays reflected by the first ring mirror from the tip region of the central mirror toward the second ring mirror are diverging as they pass from the first mirror to the second mirror.

5. Apparatus of claim 4 wherein the return rays reflected from the second ring mirror back to the first ring mirror are converging as they pass from the second mirror to the first mirror.

6. Apparatus of claim 5 wherein the rays incident on the first ring mirror from the tip region of the central mirror impinge on a different one of said two regions of the conical mirror surface than the return rays from the second ring mirror.

7. Apparatus of claim 2 wherein the rays from the central mirror are reflected by a region of the first ring mirror that is concentrically separated from the region reflecting the return rays from the second ring mirror.

8. Apparatus of claim 7 wherein the region of the first ring mirror that reflects rays from the central mirror is concentrically inside the region of the first ring mirror that reflects return rays from the second ring mirror.

9. Apparatus of claim 1 wherein the conical surfaces of the central mirror and the first mirror converge in the same direction along said axis.

10. Apparatus of claim 1 wherein the conical surfaces of the central mirror and the first mirror converge in the opposite direction along said axis.

11. An annular optical resonator comprising:
a pair of axially spaced ring mirrors having truncated substantially conical mirror surfaces, a central mirror having a substantially conical mirror surface whose axis of revolution is coaxial with the axis of revolution of said conical surfaces of the ring mirrors, the conical surface of the central mirror reflecting all incident rays from a source centered on said axis of revolution radialy outwardly to the conical surface of a first one of said ring mirrors, said rays being reflected between the two ring mirrors in an annular cylindrical region coaxial with said axis of revolution, said rays passing through said annular region being reflected radially through said axis of revolution by the other one of said ring mirrors to diametrically opposite points on the conical surface of said other ring mirror, back through the annular region to the first ring mirror, from the first ring mirror to the central mirror, and from the central mirror in a direction along the axis of revolution, the return rays being positioned in an annular space surrounding but separated from said incident rays, and feedback mirror means positioned to reflect a portion of the return rays back along the axis of revolution toward the tip region of the central mirror on the axis of revolution to provide said incident rays.

12. Apparatus of claim 11 further including output mirror means for directing all but said portion of the return rays from the central mirror in a direction away from any of said mirror surfaces.

13. Apparatus of claim 12 wherein said output mirror means comprises a mirror having a mirror surface with two optical openings in the mirror surface, the mirror being positioned along said axis of revolution with one opening centered on the axis of revolution and the other opening being positioned off the axis of revolution, said feedback mirror means being positioned to receive light passing through the off axis one of said openings and directing it back through the axis-centered one of said openings.

14. Apparatus of claim 11 wherein said central mirror and said first one of the ring mirrors is formed from a single unit.

15. Apparatus of claim 11 wherein the mirror surface of the central mirror and the mirror surface of said first one of the ring mirrors are compound surfaces.

* * * * *